United States Patent
Li et al.

(10) Patent No.: US 10,470,056 B2
(45) Date of Patent: Nov. 5, 2019

(54) SMALL CELL AND COMMUNICATION CONTROL METHOD THEREOF

(71) Applicant: Huawei Technologies Co., Ltd., Shenzhen (CN)

(72) Inventors: Yingtao Li, Shenzhen (CN); Rongdao Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 105 days.

(21) Appl. No.: 15/703,277

(22) Filed: Sep. 13, 2017

(65) Prior Publication Data

US 2018/0007564 A1 Jan. 4, 2018

Related U.S. Application Data

(63) Continuation of application No. PCT/CN2015/085437, filed on Jul. 29, 2015.

(51) Int. Cl.
*H04W 4/00* (2018.01)
*H04W 16/32* (2009.01)
(Continued)

(52) U.S. Cl.
CPC .......... *H04W 16/32* (2013.01); *H04B 1/3818* (2015.01); *H04L 5/14* (2013.01);
(Continued)

(58) Field of Classification Search
CPC ..... H04W 16/32; H04W 16/14; H04W 16/26; H04W 16/02; H04W 24/02; H04W 24/00;
(Continued)

(56) References Cited

U.S. PATENT DOCUMENTS

| | | | | |
|---|---|---|---|---|
| 2010/0099431 A1* | 4/2010 | Sampath | ............... | H04W 16/16 455/454 |
| 2010/0111062 A1* | 5/2010 | Cho | ...................... | H04W 48/08 370/338 |

(Continued)

FOREIGN PATENT DOCUMENTS

| | | | |
|---|---|---|---|
| CN | 101075848 A | | 11/2007 |
| CN | 101707795 A | | 5/2010 |

(Continued)

OTHER PUBLICATIONS

"Discussion on the coexist of eIMTA and Small Cell DC," 3GPP TSG-RAN WG2 meeting #87bis, Shanghai, China, R2-144251, XP050876487, 3rd Generation Partnership Project, Valbonne, France (Oct. 6-10, 2014).

*Primary Examiner* — Un C Cho
*Assistant Examiner* — Rasha K Fayed
(74) *Attorney, Agent, or Firm* — Leydig, Voit & Mayer, Ltd.

(57) ABSTRACT

A communication control method is disclosed, including: connecting, by a small cell by using a built-in soft SIM card or an inserted SIM card, to a Uu air interface of a macro cell to access the macro cell; after receiving a broadcast synchronization signal of the macro cell, synchronizing, by the small cell, with the macro cell, and acquiring configuration information of the macro cell; and performing, by the small cell, system configuration for the small cell according to the configuration information of the macro cell. A SIM card is added to the small cell, so that the small cell can access a macro cell in a terminal form, which is equivalent to addition of a Uu air interface between the small cell and the macro cell. Therefore, configuration management, performance optimization, admissible subscriber configuration,
(Continued)

and the like are implemented for the small cell by using this air interface.

12 Claims, 7 Drawing Sheets

(51) Int. Cl.

| | | |
|---|---|---|
| *H04W 48/08* | (2009.01) | |
| *H04W 52/00* | (2009.01) | |
| *H04W 56/00* | (2009.01) | |
| *H04W 76/00* | (2018.01) | |
| *H04W 24/02* | (2009.01) | |
| *H04B 1/3818* | (2015.01) | |
| *H04L 5/14* | (2006.01) | |
| *H04L 12/24* | (2006.01) | |
| *H04W 84/04* | (2009.01) | |
| *H04W 88/04* | (2009.01) | |
| *H04W 8/18* | (2009.01) | |

(52) U.S. Cl.
CPC ......... *H04L 41/0803* (2013.01); *H04W 24/02* (2013.01); *H04W 48/08* (2013.01); *H04W 52/00* (2013.01); *H04W 56/00* (2013.01); *H04W 56/001* (2013.01); *H04W 76/00* (2013.01); *H04W 8/186* (2013.01); *H04W 84/045* (2013.01); *H04W 84/047* (2013.01); *H04W 88/04* (2013.01)

(58) Field of Classification Search
CPC ..... H04W 48/08; H04W 48/16; H04W 48/12; H04W 48/04; H04W 48/20; H04W 52/00; H04W 52/0206; H04W 52/0229; H04W 52/02; H04W 52/54; H04W 56/00; H04W 56/001; H04W 56/0015; H04W 76/00; H04W 76/28; H04W 8/186; H04W 8/02; H04W 84/045; H04W 84/047; H04W 84/18; H04W 88/04; H04W 88/08; H04W 88/02; H04W 36/0061; H04W 36/00; H04W 36/04; H04W 36/14; H04W 36/22; H04W 36/0094; H04W 36/0088; H04W 36/32; H04W 72/042; H04W 72/0446; H04W 72/04; H04W 72/048; H04W 4/00; H04W 4/023; H04L 5/14; H04L 5/0053; H04L 5/1476

See application file for complete search history.

(56) References Cited

U.S. PATENT DOCUMENTS

| | | | |
|---|---|---|---|
| 2010/0185537 A1* | 7/2010 | Bari | G06Q 30/04 |
| | | | 705/34 |
| 2011/0128916 A1 | 6/2011 | Kwon et al. | |
| 2013/0077507 A1* | 3/2013 | Yu | H04W 48/16 |
| | | | 370/252 |
| 2013/0336177 A1 | 12/2013 | Gao et al. | |
| 2014/0128092 A1 | 5/2014 | Xiong et al. | |
| 2014/0226541 A1 | 8/2014 | Xu et al. | |
| 2014/0226636 A1* | 8/2014 | Xu | H04W 72/042 |
| | | | 370/336 |
| 2015/0173011 A1* | 6/2015 | Das | H04W 16/26 |
| | | | 370/328 |
| 2016/0212632 A1* | 7/2016 | Katamreddy | H04W 8/005 |

FOREIGN PATENT DOCUMENTS

| | | |
|---|---|---|
| CN | 101778463 A | 7/2010 |
| CN | 101784094 A | 7/2010 |
| CN | 102883440 A | 1/2013 |
| CN | 103220815 A | 7/2013 |
| KR | 20110050359 A | 5/2011 |
| WO | 2012113131 A1 | 8/2012 |
| WO | 2015076585 A1 | 5/2015 |

* cited by examiner

SMALL CELL AND COMMUNICATION CONTROL METHOD THEREOF

CROSS-REFERENCE TO RELATED APPLICATIONS

This application is a continuation of International Application No. PCT/CN2015/085437, filed on Jul. 29, 2015, the disclosure of which is hereby incorporated by reference in its entirety.

TECHNICAL FIELD

The present application relates to communication control methods on a wireless communications network, and in particular, to a small cell and a communication control method thereof.

BACKGROUND

With development and popularization of smartphones, data traffic of mobile communications is steadily on the rise. Particularly, as people increasingly use applications, such as microblog, WeChat, Facebook, and Twitter, it becomes increasingly hard for conventional cellular communications to meet ever-increasing communication traffic required by people. According to statistics, in global mobile communications, approximately 70% data traffic is generated indoors. This shows that most broadband data traffic of people, such as that for video services, online games, microblog browsing, and WeChat, is generated in indoor environments. Therefore, it is particularly important to improve indoor signal coverage and indoor user experience for an indoor subscriber. In recent years, small cells have drawn wide attention in the communications industry. A small cell is a small-sized low-power base station, and can provide, based on existing 3G and 4G wireless standard protocols, wireless communications services for mobile terminals. Small cells are mainly deployed in public places such as shopping malls, offices, and coffee houses, or inside homes. The small cell can make up for an indoor coverage shortage of a macro cell, and avoid difficulties in site selection for the macro cell. In addition, compared with the macro cell, the small cell can perform transmission at lower power, and therefore, the small cell is more environmentally friendly.

Figure 1:
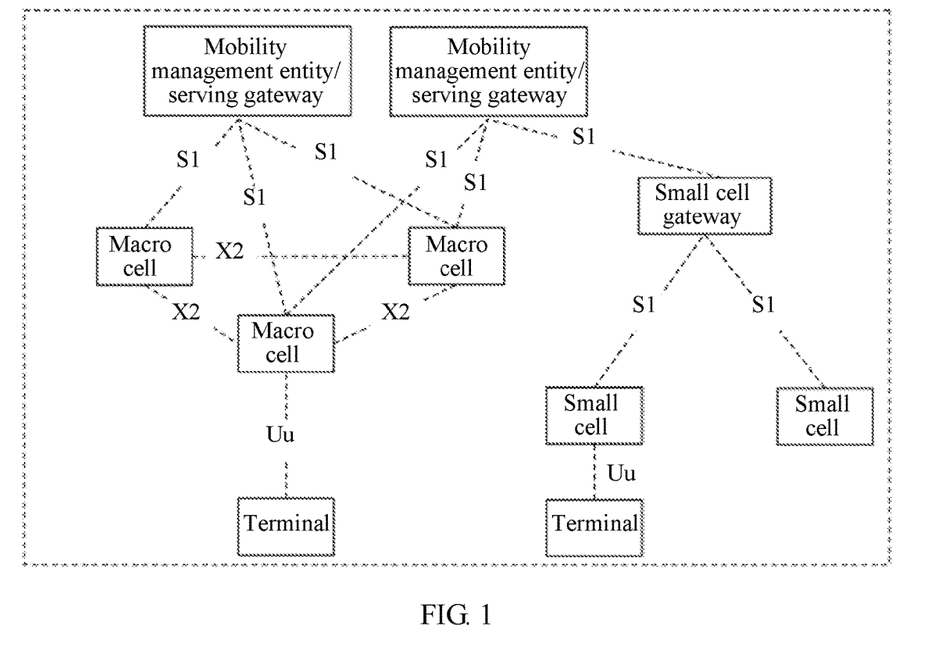
FIG. 1 is a schematic diagram of wireless network communications in the prior art.

In the prior art, a small cell acts as a small-sized based station with low power consumption to provide communications services for mobile subscribers. As shown in FIG. 1, the small cell is connected to a Mobility Management Entity (MME)/Serving Gateway (SGW) by using a small cell gateway, to connect to a core network. In addition, the small cell provides wireless communications services for terminals within coverage of the small cell. An S1 interface exists between a macro cell and the MME/SGW, and an X2 interface exists between macro cells. A macro cell is connected to the core network by using the MME/SGW, and provides wireless communications services for terminals within coverage of the macro cell.

However, in the prior art, no communications interface exists between small cells or between a small cell and a macro cell. Consequently, on one hand, a small cell cannot obtain related information such as a working frequency, a frequency band, and a neighboring cell list of a macro cell; on the other hand, the macro cell cannot obtain related information such as a working frequency, an operating environment, and communication performance of the small cell either. Therefore, it is inconvenient for an operator to perform configuration management, performance optimization, interference coordination management, and fault detection, and the like for a small cell.

SUMMARY

Embodiments of the present application provide a small cell and a communication control method thereof, so as to implement convenient configuration management for a small cell by using an air interface between the small cell and a macro cell.

According to a first aspect, a communication control method is provided, where the method includes:

connecting, by a small cell by using a built-in soft SIM card or an inserted SIM card, to a Uu air interface of a macro cell to access the macro cell;

after receiving a broadcast synchronization signal of the macro cell, synchronizing, by the small cell, with the macro cell, and acquiring configuration information of the macro cell; and performing, by the small cell, system configuration for the small cell according to the configuration information of the macro cell.

With reference to the first aspect, in a first implementation manner of the first aspect, the configuration information of the macro cell includes system information of the macro cell.

With reference to the first aspect or the first implementation manner of the first aspect, in a second implementation manner of the first aspect, the system information of the macro cell includes a working frequency of the macro cell.

With reference to the first aspect or the first implementation manner of the first aspect or the second implementation manner of the first aspect, in a third implementation manner of the first aspect, the performing, by the small cell, system configuration for the small cell according to the configuration information of the macro cell includes:

configuring a working frequency of the small cell to be the same as the working frequency of the macro cell.

With reference to any one of the first aspect or the first to the third implementation manners of the first aspect, in a fourth implementation manner of the first aspect, the system information of the macro cell includes an uplink-to-downlink subframe configuration ratio in time division multiplexing (TDD, or Time Division Duplexing).

With reference to any one of the first aspect or the first to the fourth implementation manners of the first aspect, in a fifth implementation manner of the first aspect, the performing, by the small cell, system configuration for the small cell according to the configuration information of the macro cell includes:

configuring an uplink-to-downlink subframe configuration ratio of the small cell in time division multiplexing to be the same as the uplink-to-downlink subframe configuration ratio of the macro cell in time division multiplexing.

With reference to any one of the first aspect or the first to the fifth implementation manners of the first aspect, in a sixth implementation manner of the first aspect, the configuration information of the macro cell includes a physical cell identifier of the macro cell and system information of a neighboring cell of the macro cell, and the system message of the neighboring cell of the macro cell includes at least three physical cell identifiers of the neighboring cell of the macro cell.

With reference to any one of the first aspect or the first to the sixth implementation manners of the first aspect, in a seventh implementation manner of the first aspect, the performing, by the small cell, system configuration for the small cell according to the configuration information of the macro cell includes:

determining that a configured physical cell identifier of the small cell is different from the physical cell identifier of the macro cell and the physical cell identifiers of the neighboring cell of the macro cell.

According to a second aspect, a small cell is provided, where the small cell connects, by using a built-in soft SIM card or an inserted SIM card, to an air interface of a macro cell to access the macro cell, and includes:

a synchronization receiving circuit, configured to: after receiving a broadcast synchronization signal of the macro cell, synchronize with the macro cell, and acquire configuration information of the macro cell; and a configuration circuit, configured to perform system configuration for the small cell according to the configuration information of the macro cell.

According to a third aspect, a method for configuring, by using a terminal, a subscriber admissible to a small cell is provided, where the method includes:

receiving, by the terminal, a closed subscriber group identity (CSG ID) that is of the small cell and broadcast by the base station, where only a terminal belonging to the closed subscriber group is allowed to access the small cell, and the small cell establishes a connection to a macro cell by using a built-in soft SIM card or an inserted SIM card and an air interface;

determining, by the terminal, whether the closed subscriber group identity is in a closed subscriber group identity list that is stored by the terminal, and if yes, accessing, by the terminal, the small cell; and selecting, by the terminal, one or more subscribers from a subscriber list or a contact list of the terminal to form an admissible subscriber list, sending the admissible subscriber list to the small cell, and indicating that a subscriber in the admissible subscriber list is a subscriber that is allowed to access the small cell, where the admissible subscriber list includes mobile numbers of the one or more subscribers.

According to a fourth aspect, a method for configuring a subscriber admissible to a small cell is provided, where the method includes:

broadcasting, by the small cell, a closed subscriber group identity (CSG ID) of the small cell, where only a terminal belonging to the closed subscriber group is allowed to access the small cell, and the small cell has a built-in soft SIM card or an inserted SIM card, and establishes a connection to a macro cell by using an air interface; and receiving, by the small cell, an admissible subscriber list of the terminal, where the admissible subscriber list is formed by one or more subscribers that are selected by the terminal from a subscriber list or a contact list of the terminal, and receiving an indication, from the terminal to the cell, that a subscriber in the admissible subscriber list is a subscriber that is allowed to access the small cell, where the admissible subscriber list includes mobile numbers of the one or more subscribers.

According to a fifth aspect, a data transmission method is provided, where the method includes:

establishing, by a small cell, a connection to a terminal, and receiving data transmitted by the terminal, where the small cell has a built-in soft SIM card or an inserted SIM card, and establishes a connection to a macro cell by using an air interface; and determining whether a link between the small cell and a small cell gateway or between a small cell gateway and an MME/SGW or between an MME/SGW and a next node is normal; and if a determining result is that the link is working, sending, by the small cell, the received data to the small cell gateway, or otherwise, establishing, by the small cell, a link between the small cell and the macro cell by using the air interface between the small cell and the macro cell, and sending, by the macro cell, the received data to the MME/SGW.

According to a sixth aspect, an interference coordination management method of a small cell is provided, where the method includes:

establishing, by the small cell, a connection to a macro cell by using an air interface between the small cell and the macro cell;

receiving, by the small cell, a pilot signal of the macro cell, and measuring power of the pilot signal; and adjusting, by the small cell, transmit power of the small cell according to a measurement result of the power of the pilot signal and an adjustment policy, where the adjustment policy is that when the measured power of the pilot signal of the macro cell is greater than a threshold, the small cell adjusts the transmit power to first transmit power, and when the measured power of the pilot signal of the macro cell is less than the threshold, the small cell adjusts the transmit power to second transmit power, where maximum transmit power of the small cell>the first transmit power>the second transmit power>zero.

A SIM card is added to a small cell provided in the embodiments of the present application, so that the small cell can access a macro cell in a terminal form, which is equivalent to addition of a Uu air interface between the small cell and the macro cell. Therefore, configuration management, performance optimization, admissible subscriber configuration, and the like are implemented for the small cell by using this air interface.

DESCRIPTION OF EMBODIMENTS

The following further details the technical solutions of the present application with reference to the accompanying drawings and embodiments.

In an existing wireless communications system, a small cell cannot directly communicate with a macro cell because no communications interface exists between them. However, a small cell and a macro cell are not independent of each other on a network, but coexist on one network and affect each other. Therefore, how small cells or how a small cell and a macro cell communicate with each other to implement automatic configuration is a concern of the present application.

Figure 2:
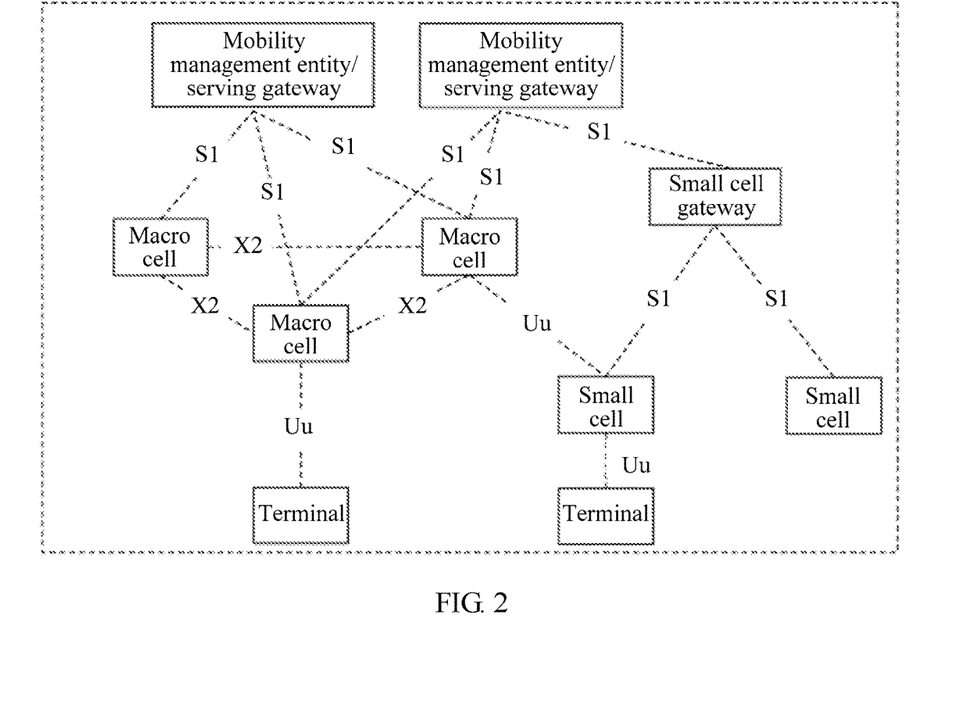
FIG. 2 is a schematic diagram of wireless network communications according to the present application.

Referring to FIG. 2, in the embodiments of the present application, a small cell is a small-sized base station having relatively low power, and is mainly deployed indoors. The small cell provides wireless communications services for terminals within relatively small coverage. A wireless protocol standard used for an air interface of the small cell may be an existing 4G (4th Generation) or LTE (Long Term Evolution) technical standard, or may be the LTE-based LTE-Advanced (Long Term Evolution Advanced) technical standard, or may be the future fifth generation communications technology 5G (5th Generation) technical standard. A terminal within coverage of the small cell accesses the small cell by using a Uu air interface between the terminal and the small cell, and then accesses a core network by using a small cell gateway. The small cell is connected to the small cell gateway by using an S1 interface. The small cell gateway is responsible for aggregating and forwarding signaling and data between the small cell and the core network. A macro cell is a higher-power base station deployed outdoors with coverage up to several kilometers or even tens of kilometers. A macro cell provides wireless communications services for terminals and small cells by using a Uu air interface. Macro cells are connected to each other by using an X2 interface. The macro cell is connected to a mobility management entity (MME)/serving gateway (SGW) by using an S1 interface. The MME/SGW is responsible for managing subscriber mobility, and routing and forwarding data packets of subscribers. In addition, it should be pointed out that the MME/SGW refers to an MME or an SGW.

In addition, the small cell has a built-in soft SIM (subscriber identity module) card or an inserted SIM card. A globally unique identity of the small cell is built in the SIM card. By using the SIM, the small cell can access the macro cell in a terminal form, and communicate with the macro cell by using the Uu air interface between the small cell and the macro cell. In this way, authentication, configuration management, performance optimization control, interference coordination management, and the like can be performed for the small cell by using a cellular connection.

Embodiment 1

As shown in FIG. 2, in a communication control method according to Embodiment 1 of the present application, a small cell has a built-in soft SIM card or an inserted SIM card. A globally unique identity of the small cell is built in the SIM card. By using the SIM, the small cell can access an air interface in a terminal form, and synchronize with and access a macro cell by using the air interface of the macro cell, to obtain system information of the macro cell and physical cell identifiers of the macro cell and of a neighboring cell; and perform configuration management for the small cell according to the obtained system information of the macro cell and the obtained physical cell identifiers of the macro cell and of the neighboring cell. In addition, after the built-in soft SIM card or the inserted SIM card is provided, the small cell is provided with a globally unique identity, which provides great convenience for an operator to perform monitoring and management operations for the small cell.

Figure 3:
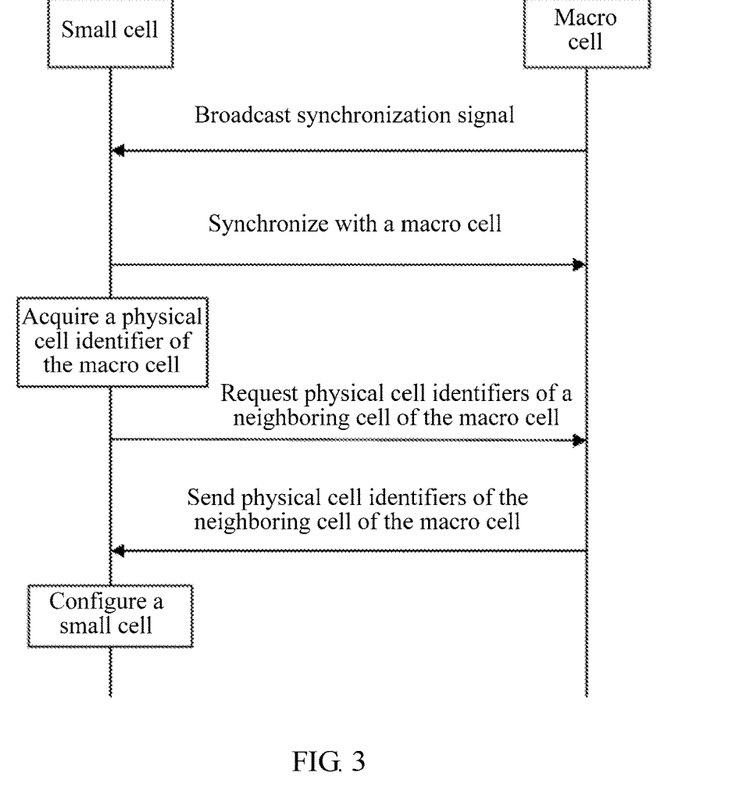
FIG. 3 is a schematic flowchart of a communication control method according to Embodiment 1 of the present application.

Also referring to FIG. 3, the communication control method mainly includes the following steps:

Step 101. A small cell connects, by using a built-in soft SIM card or an inserted SIM card, to a Uu air interface of a macro cell to access the macro cell.

Step 102. After receiving a broadcast synchronization signal of the macro cell, the small cell synchronizes with the macro cell, and acquires configuration information of the macro cell.

Step 103. The small cell performs system configuration for the small cell according to the configuration information of the macro cell.

The configuration information includes a physical cell identifier of the macro cell, system information of the macro cell, and system information of a neighboring cell of the macro cell.

The system information of the macro cell includes a working frequency and an uplink-to-downlink subframe configuration ratio in time division multiplexing (TDD, or Time Division Duplexing) of the macro cell. The synchronization signal may be one synchronization signal, or may be synchronization signals that include two levels of signals, such as a primary synchronization signal and a secondary synchronization signal. The small cell sends a request message to the macro cell, and receives physical cell identifiers of the neighboring cell that are sent by the macro cell. There are at least three physical cell identifiers of the neighboring cell, and the request message is a request for the physical cell identifiers of the neighboring cell of the macro cell from the macro cell.

The small cell performs system configuration for the small cell according to the physical cell identifier of the macro cell, the system information of the macro cell, and the physical cell identifiers of the neighboring cell of the macro cell. In this way, automatic configuration of the small cell can be implemented. In addition, a working frequency of the small cell may be configured to be the same as the working frequency of the macro cell, and an uplink-to-downlink subframe configuration ratio in time division multiplexing of the small cell may be configured to be the same as the configuration ratio of the macro cell. Moreover, it is ensured that a physical cell identifier of the small cell is different from the physical cell identifier of the macro cell and the physical cell identifiers of the neighboring cell of the macro cell. In this way, frequency resource utilization on an entire network is high, and effective coordination with the macro cell is implemented to avoid interference and generate higher frequency utilization.

It can be seen that, in this embodiment of the present application, a SIM card and a corresponding SIM communications apparatus are added to a small cell, so that the small cell can access a macro cell in a terminal form, which is equivalent to that a Uu air interface is added between the small cell and the macro cell, so that communication and interaction between the small cell and the macro cell are established by using this air interface. In this way, the small cell can perform configuration management, performance optimization, admissible subscriber configuration, and the like for the macro cell, and further, configuration management of the small cell is more convenient and more appropriate and utilization of frequency resources of a system is higher.

Embodiment 2

Figure 4:
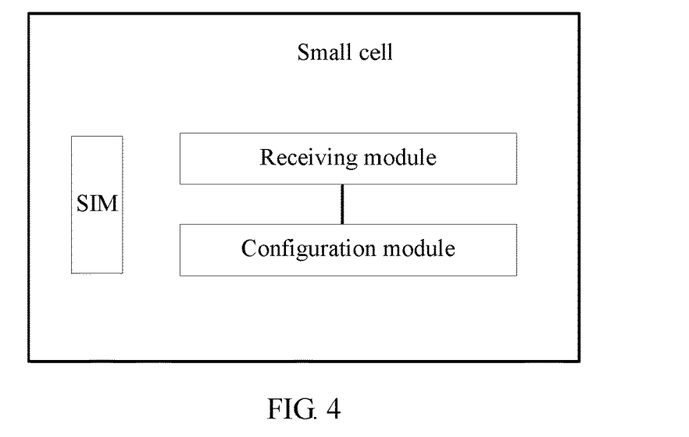
FIG. 4 is a schematic diagram of a small cell according to Embodiment 2 of the present application.

As shown in FIG. 4, a small cell in Embodiment 2 of the present application connects, by using a built-in soft SIM or an inserted SIM card, to an air interface of a macro cell to access the macro cell. The small cell includes:

a synchronization receiving circuit, configured to: after receiving a broadcast synchronization signal of the macro cell, synchronize with the macro cell, and acquire configuration information of the macro cell; and a configuration circuit, configured to perform system configuration for the small cell according to the configuration information of the macro cell.

The configuration information includes a physical cell identifier of the macro cell, system information of the macro cell, and system information of a neighboring cell of the macro cell.

The system information of the macro cell includes a working frequency and an uplink-to-downlink subframe configuration ratio in time division multiplexing (TDD, or Time Division Duplexing) of the macro cell. The synchronization signal may be one synchronization signal, or may be synchronization signals that include two levels of signals, such as a primary synchronization signal and a secondary synchronization signal.

The macro cell sends a request message, and receives, by using the receiving circuit, physical cell identifiers of the neighboring cell that are sent by the macro cell. There are at least three physical cell identifiers of the neighboring cell, and the request message is a request for the physical cell identifiers of the neighboring cell of the macro cell from the macro cell.

The configuration circuit may configure system settings of the small cell, according to the physical cell identifier of the macro cell, the system information of the macro cell, and the physical cell identifiers of the neighboring cell of the macro cell.

The synchronization circuit may be further configured to: configure a working frequency of the small cell to be the same as the working frequency of the macro cell, configure an uplink-to-downlink subframe configuration ratio in time division multiplexing of the small cell to be the same as the configuration ratio of the macro cell, and determine that a configured physical cell identifier of the small cell is different from the physical cell identifier of the macro cell and the physical cell identifiers of the neighboring cell of the macro cell.

It can be seen that, a SIM card and a corresponding SIM communications apparatus are added to a small cell, so that the small cell can access a macro cell in a terminal form, which is equivalent to that a Uu air interface is added between the small cell and the macro cell, so that communication and interaction between the small cell and the macro cell are established by using this air interface. In this way, the small cell can perform configuration management, performance optimization, admissible subscriber configuration, and the like for the macro cell. Further, configuration management of the small cell is more convenient and more appropriate and utilization of frequency resources of a system is higher.

Embodiment 3

Figure 5:
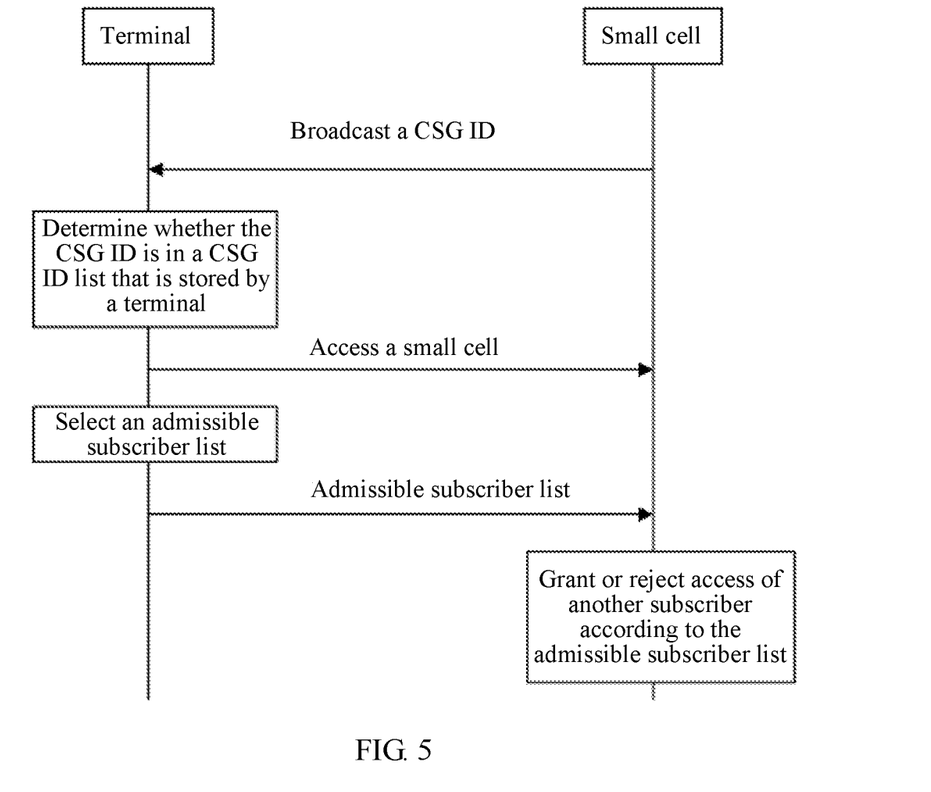
FIG. 5 is a schematic flowchart of a method for configuring a subscriber admissible to a small cell according to Embodiment 3 of the present application.

As shown in FIG. 5, in a method for configuring a subscriber admissible to a small cell according to Embodiment 3, on a basis that the small cell has a built-in soft SIM card or an inserted SIM card, a connection is established by using an air interface between the small cell and a macro cell, so that a subscriber admissible to a small cell can be configured by using a communications link between a terminal device and the macro cell and a communications link between the small cell and the macro cell.

The foregoing method for configuring a subscriber admissible to a small cell includes:

Step 201. The small cell broadcasts a closed subscriber group identity (CSG ID) of the small cell, where only a terminal belonging to the closed subscriber group is allowed to access the small cell, and the small cell has a built-in soft SIM card or an inserted SIM card, and the small cell establishes a connection to a macro cell by using an air interface.

Step 202. A terminal receives the closed subscriber group identity broadcast by the small cell, determines whether the closed subscriber group identity is in a closed subscriber group identity list that is stored by the terminal, and if yes, accesses the small cell.

Step 203. The terminal selects one or more subscribers from a subscriber list or a contact list of the terminal to form an admissible subscriber list, sends the admissible subscriber list to the small cell, and indicates that a subscriber in the admissible subscriber list is a subscriber that is allowed to access the small cell, where the admissible subscriber list includes mobile numbers of the one or more subscribers.

Step 204. The small cell receives an access request of another terminal after receiving the admissible subscriber list of the terminal; and allows the another terminal to access the small cell if the another terminal is in the admissible subscriber list, or otherwise, rejects access of the another terminal to the small cell.

In addition, by using a Uu air interface between the small cell and the macro cell, the terminal may further select, according to the closed subscriber group identity that is obtained by the terminal from the small cell, a list of subscribers allowed to access the small cell from the contact list, and transmit the subscriber list to the small cell by using a link between the terminal and the macro cell and a link between the macro cell and the small cell. Then the small cell accepts or rejects access of another subscriber according to the subscriber list.

Embodiment 4

As shown in FIG. 1, a conventional process of transmitting data of a subscriber of a small cell is generally: A terminal accesses the small cell, and data of the terminal is transmitted to the small cell by using an air interface between the terminal and the small cell, then to a small cell gateway by using an interface between the small cell and the small cell gateway, and then to a core network by using the small cell gateway.

Figure 6:
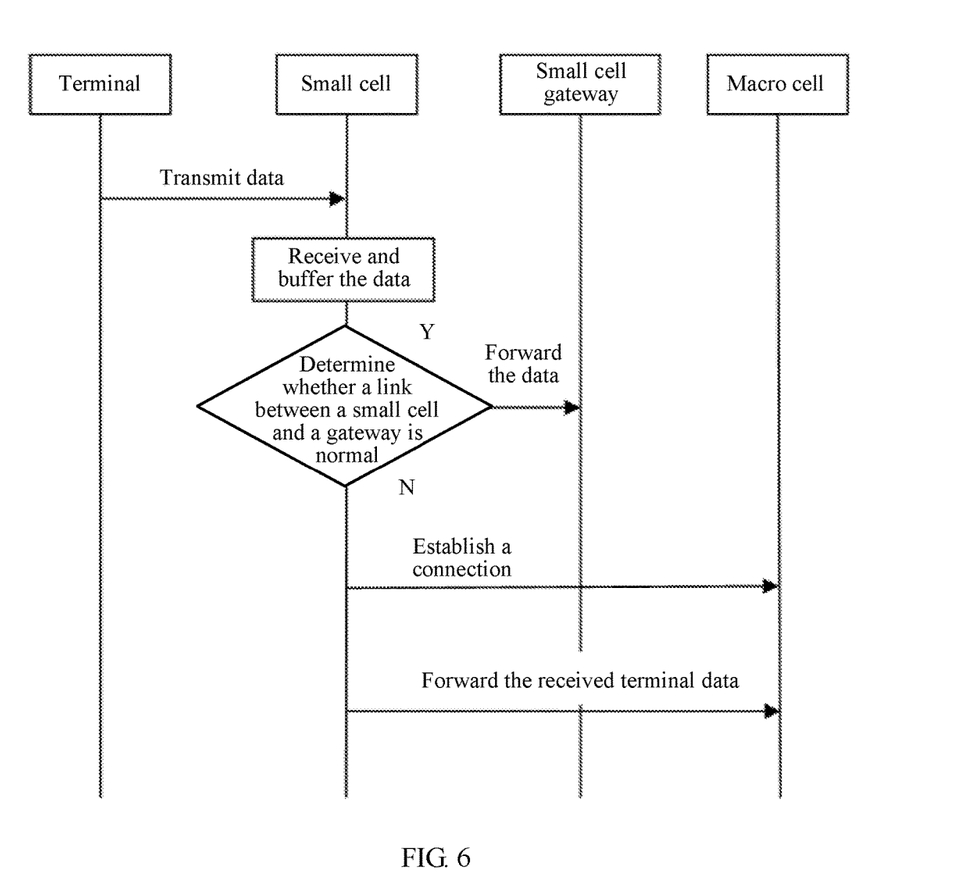
FIG. 6 is a schematic flowchart of a data transmission method according to Embodiment 4 of the present application.

Referring to both FIG. 2 and FIG. 6, in a data transmission method in this embodiment of the present application, a small cell has a soft SIM card or an inserted SIM card, and a link formed by using an air interface exists between the small cell and a macro cell. Therefore, when detecting that a fault occurs on a link between the small cell and a small cell gateway or between a small cell gateway and an MME/SGW, the small cell establishes a connection between the small cell and the macro cell, and forwards received terminal subscriber data by using the link between the small cell and the macro cell. In this way, service continuity is ensured.

The data transmission method includes the following steps:

Step 301. A small cell establishes a connection to a terminal, and receives data transmitted by the terminal.

Step 302. Determine whether a link between the small cell and a small cell gateway or between a small cell gateway and an MME/SGW or between an MME/SGW and a next node is normal; and if a determining result is that the link is normal, the small cell sends, to the small cell gateway, the received data transmitted by the terminal, or otherwise, the small cell sends the data to the MME/SGW by using a link between the small cell and a macro cell and by means of forwarding by the macro cell, where the link between the small cell and the macro cell is established by the small cell by using an air interface of the macro cell.

Whether the link is normal is mainly determined by detecting whether the sending fails or whether a transmission speed is abnormally low.

Embodiment 5

In an interference coordination management method of a small cell according to Embodiment 5 of the present application, a small cell has a soft SIM card or a SIM card, and a link formed by using an air interface exists between the small cell and a macro cell.

Figure 7:
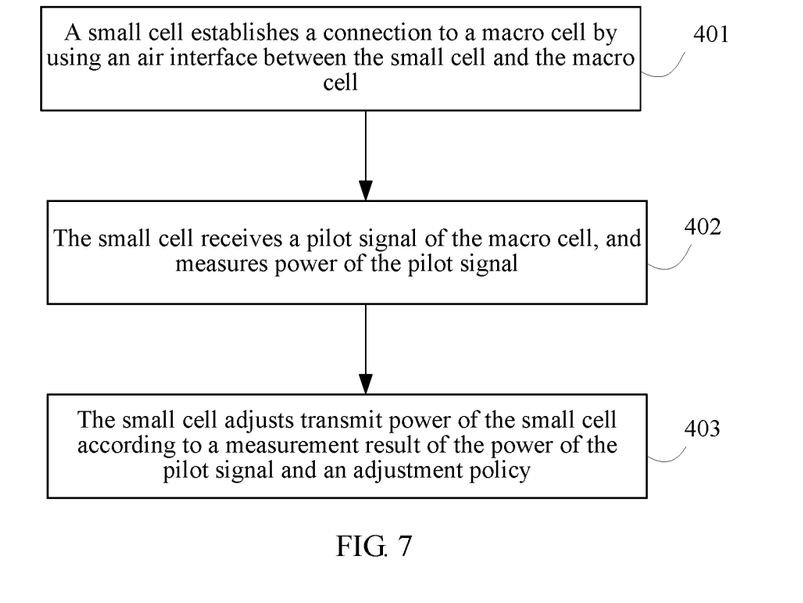
FIG. 7 is flow block diagram of an interference coordination management method of a small cell according to Embodiment 5 of the present application.

As shown in FIG. 7, the interference coordination management method of a base station includes the following steps:

Step 401. The small cell establishes a connection to a macro cell by using an air interface between the small cell and the macro cell.

Step 402. The small cell receives a pilot signal of the macro cell, and measures power of the pilot signal.

Step 403. The small cell adjusts transmit power of the small cell according to a measurement result of the power of the pilot signal and an adjustment policy, where the adjustment policy is that when the measured power of the pilot signal of the macro cell is greater than a threshold, the small cell adjusts the transmit power to first transmit power, and when the measured power of the pilot signal of the macro cell is less than the threshold, the small cell adjusts the transmit power to second transmit power, where maximum transmit power of the small cell>the first transmit power>the second transmit power>zero.

The threshold is preset. The threshold may be adjusted continuously in a test process until an appropriate threshold is selected to minimize mutual interference between the macro cell and the small cell.

Figure 8:
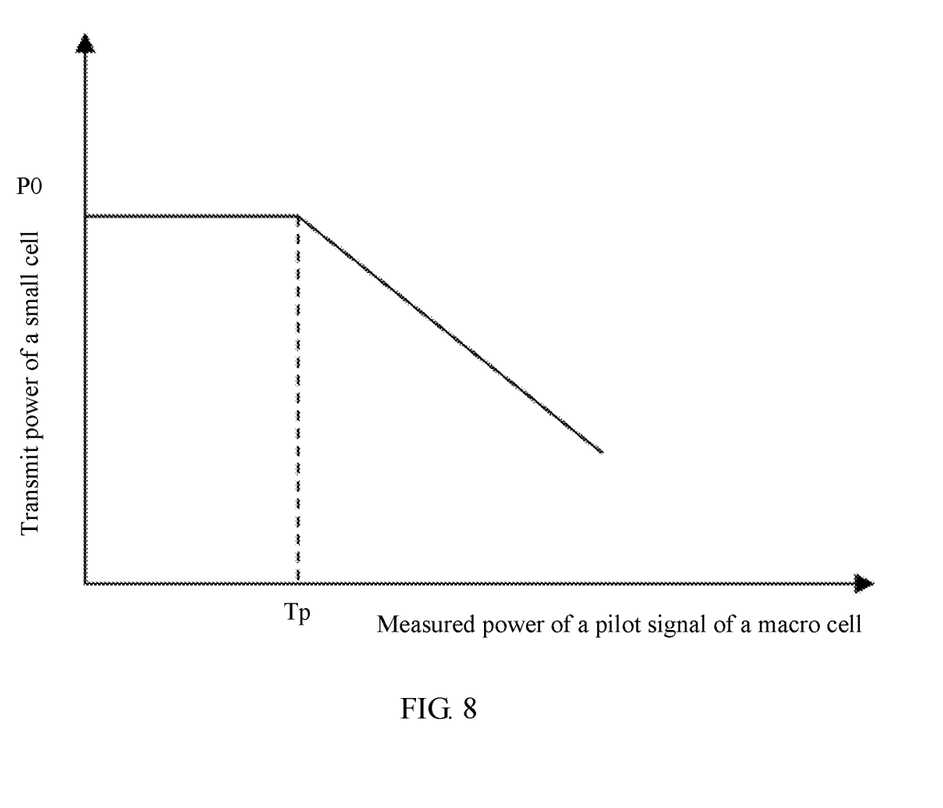
FIG. 8 is schematic diagram of the interference coordination management method of a small cell according to Embodiment 5 of the present application.

As shown in FIG. 8, when the power, which is measured by the small cell, of the pilot signal of the macro cell is less than a threshold Tp, the small cell performs transmission at power P0, where P0 is less than maximum power of the small cell. When the measured power of the pilot signal of the macro cell is greater than the threshold Tp, the small cell decreases a transmit power to be less than P0. In this way, frequent handover of a subscriber between the small cell and the macro cell can be avoided, and interference between the small cell and the macro cell can also be effectively managed and coordinated.

In addition, the small cell divides a system bandwidth of the small cell into multiple frequency bands for transmission of subscriber data. The small cell measures interference signal strengths on different frequency bands, and schedules, according to the interference signal strengths on the different frequency bands, a frequency band with a low interference signal strength for transmission of the subscriber data.

For example, the small cell schedules and transmits subscriber data at a given system bandwidth. A bandwidth of 20 MHz is used as an example. Generally, the system bandwidth (20 MHz) is divided into multiple frequency bands. For example, the bandwidth of 20 MHz is divided into 20 frequency bands, and a bandwidth of 1 MHz is for each frequency band. The small cell schedules data transmission for multiple subscribers, and each subscriber occupies one or more frequency bands. The small cell measures interference signal strengths on different frequency bands, and schedules, according to the interference signal strengths on the frequency bands, a frequency band with a low interference signal strength for transmission of the subscriber data. If the small cell finds that signal interference on some frequency bands are particularly strong, the small cell may evade these frequency bands with strong interference, and schedule a frequency band with weaker interference for transmission of the subscriber. In this way, reliability of data transmission can be ensured, and a data transmission error resulting from strong interference is avoided.

In the foregoing specific implementation manners, the objective, technical solutions, and benefits of the present application are further described in detail. It should be understood that the foregoing descriptions are merely specific implementation manners of the present application, but are not intended to limit the protection scope of the present application. Any modification, equivalent replacement, or improvement made without departing from the principle of the present application should fall within the protection scope of the present application.

What is claimed is:

1. A communication control method, comprising:
connecting, by a small cell by using a built-in soft subscriber identity module (SIM) card or an inserted SIM card, to an air interface of a macro cell to access the macro cell;
receiving, by the small cell, a broadcast synchronization signal of the macro cell;
after receiving the broadcast synchronization signal of the macro cell, synchronizing, by the small cell, with the macro cell, and acquiring configuration information of the macro cell; and
performing, by the small cell, system configuration for the small cell according to the configuration information of the macro cell;
wherein the configuration information of the macro cell comprises system information of the macro cell and system information of neighboring cells of the macro cell,
wherein the system information of the macro cell comprises a physical cell identifier of the macro cell, and
wherein the system information of the neighboring cells of the macro cell comprises at least three physical cell identifiers of the neighboring cells of the macro cell.

2. The communication control method according to claim 1, wherein the system information of the macro cell comprises a working frequency of the macro cell.

3. The communication control method according to claim 2, wherein the performing, by the small cell, system configuration for the small cell according to the configuration information of the macro cell comprises:
configuring a working frequency of the small cell to be the same as the working frequency of the macro cell.

4. The communication control method according to claim 1, wherein the system information of the macro cell comprises an uplink-to-downlink subframe configuration ratio in time division duplexing (TDD).

5. The communication control method according to claim 4, wherein the performing, by the small cell, system configuration for the small cell according to the configuration information of the macro cell comprises:

configuring an uplink-to-downlink subframe configuration ratio of the small cell in TDD to be the same as the uplink-to-downlink subframe configuration ratio of the macro cell in TDD.

6. The communication control method according to claim 1, wherein the performing, by the small cell, system configuration for the small cell according to the configuration information of the macro cell comprises:

configuring a configured physical cell identifier of the small cell different from the physical cell identifier of the macro cell and the physical cell identifiers of the neighboring cell of the macro cell.

7. A small cell, comprising:

a synchronization receiving circuit, configured to synchronize with a macro cell after receiving a broadcast synchronization signal of the macro cell, wherein the small cell connects, by using a built-in soft subscriber identity module (SIM) or an inserted SIM card, to the air interface of the macro cell to access the macro cell; and a configuration circuit, configured to perform system configuration for the small cell according to the configuration information of the macro cell;

wherein the configuration information of the macro cell comprises system information of the macro cell and system information of neighboring cells of the macro cell, wherein the system information of the macro cell comprises a physical cell identifier of the macro cell, and wherein the system message of the neighboring cells of the macro cell comprises at least three physical cell identifiers of the neighboring cells of the macro cell.

8. The small cell according to claim 7, wherein the system information of the macro cell comprises a working frequency of the macro cell.

9. The small cell according to claim 8, wherein the configuration circuit is further configured to:

configure a working frequency of the small cell to be the same as the working frequency of the macro cell.

10. The small cell according to claim 7, wherein the system information of the macro cell comprises an uplink-to-downlink subframe configuration ratio in time division duplexing (TDD).

11. The small cell according to claim 10, wherein the configuration circuit is further configured to:

configure an uplink-to-downlink subframe configuration ratio of the small cell in TDD to be the same as the uplink-to-downlink subframe configuration ratio of the macro cell in TDD.

12. The small cell according to claim 7, wherein the configuration circuit is further configured to:

determine that a configured physical cell identifier of the small cell is different from the physical cell identifier of the macro cell and the physical cell identifiers of the neighboring cell of the macro cell.

* * * * *